(12) United States Patent
Imaseki

(10) Patent No.: US 8,649,924 B2
(45) Date of Patent: *Feb. 11, 2014

(54) TORQUE CONTROL MAP TO INITIATE ENGINE STARTUP PROCESSING IN A HYBRID VEHICLE

(75) Inventor: Takashi Imaseki, Yokohama (JP)

(73) Assignee: Bosch Corporation, Tokyo (JP)

( * ) Notice: Subject to any disclaimer, the term of this patent is extended or adjusted under 35 U.S.C. 154(b) by 672 days.

This patent is subject to a terminal disclaimer.

(21) Appl. No.: 12/745,373

(22) PCT Filed: Nov. 26, 2008

(86) PCT No.: PCT/JP2008/071413
§ 371 (c)(1),
(2), (4) Date: May 28, 2010

(87) PCT Pub. No.: WO2009/069637
PCT Pub. Date: Jun. 4, 2009

(65) Prior Publication Data
US 2010/0312422 A1    Dec. 9, 2010

(30) Foreign Application Priority Data
Nov. 30, 2007   (JP) ................................ 2007-311029

(51) Int. Cl.
*B60W 10/06*    (2006.01)
*B60W 10/08*    (2006.01)
*G06F 17/00*    (2006.01)

(52) U.S. Cl.
USPC ... 701/22; 180/65.21; 180/65.28; 180/65.285

(58) Field of Classification Search
None
See application file for complete search history.

(56) References Cited

U.S. PATENT DOCUMENTS 4,042,056 A * 8/1977 Horwinski ................. 180/65.25
4,671,139 A * 6/1987 Downs et al. ................. 477/148

(Continued)

FOREIGN PATENT DOCUMENTS

JP        10035301 A  *  2/1998  ............ B60K 17/04
JP        2000103259      4/2000

(Continued)

OTHER PUBLICATIONS

Translation of Tsuneyoshi et al., JP,2006-298079,A.*

(Continued)

*Primary Examiner* — Fadey Jabr
*Assistant Examiner* — Krishnan Ramesh
(74) *Attorney, Agent, or Firm* — Michael Best & Friedrich LLP

(57) ABSTRACT

To enable a smooth transition from motor travel to hybrid travel despite the situation-of-charge of a battery and reduce shock at the time of engagement of a clutch element.

A hybrid system uses a state map 70 for deciding target torques of an engine and a motor on the basis of an accelerator stroke position, a vehicle velocity and a battery state-of-charge SOC. In the map 70, there are defined a motor maximum torque line that demarcates a motor upper limit torque that changes depending on the SOC and a motor margin torque line that is a predetermined margin lower than the motor maximum torque line. When the position on the map determined by the accelerator stroke position, the vehicle velocity and the battery state-of-charge is below the margin torque line, the hybrid system performs electric travel, and when the position on the map is on or above the margin torque line, the hybrid system initiates engine startup processing, and when the position on the map becomes a torque position exceeding the maximum torque line, the hybrid system sets target torques of the engine and the motor in order to achieve a torque corresponding to the accelerator stroke position.

11 Claims, 6 Drawing Sheets

(56) References Cited

U.S. PATENT DOCUMENTS

| | | | | |
|---|---|---|---|---|
| 5,833,570 | A | * | 11/1998 | Tabata et al. ............... 477/3 |
| 5,841,201 | A | * | 11/1998 | Tabata et al. ............. 290/40 C |
| 5,899,286 | A | * | 5/1999 | Yamaguchi ............. 180/65.21 |
| 5,951,614 | A | * | 9/1999 | Tabata et al. ................ 701/54 |
| 6,090,007 | A | * | 7/2000 | Nakajima et al. ............. 477/46 |
| 6,098,733 | A | * | 8/2000 | Ibaraki et al. ............ 180/65.28 |
| 6,110,066 | A | * | 8/2000 | Nedungadi et al. ............ 475/5 |
| 6,369,539 | B1 | * | 4/2002 | Morimoto et al. ........... 318/369 |
| 6,377,883 | B1 | * | 4/2002 | Shimabukuro et al. ........ 701/51 |
| 6,549,840 | B1 | * | 4/2003 | Mikami et al. ............... 701/69 |
| 6,741,917 | B2 | * | 5/2004 | Tomikawa ..................... 701/22 |
| 6,827,167 | B2 | * | 12/2004 | Cikanek et al. ............ 180/65.6 |
| 6,886,648 | B1 | * | 5/2005 | Hata et al. ............... 180/65.235 |
| 2001/0020789 | A1 | * | 9/2001 | Nakashima ............... 290/40 C |
| 2002/0062183 | A1 | * | 5/2002 | Yamaguchi et al. .......... 701/22 |
| 2002/0063002 | A1 | * | 5/2002 | Lasson ....................... 180/65.3 |
| 2002/0123409 | A1 | * | 9/2002 | Suzuki et al. ................... 477/3 |
| 2003/0006076 | A1 | * | 1/2003 | Tamor ....................... 180/65.2 |
| 2003/0183431 | A1 | * | 10/2003 | Cikanek et al. ............ 180/65.6 |
| 2004/0040810 | A1 | * | 3/2004 | Notsu et al. ................. 192/3.54 |
| 2004/0163860 | A1 | * | 8/2004 | Matsuzaki et al. .......... 180/65.2 |
| 2004/0256165 | A1 | * | 12/2004 | Tomita et al. ............... 180/65.2 |
| 2005/0065690 | A1 | * | 3/2005 | Ashizawa et al. ............. 701/51 |
| 2005/0101433 | A1 | * | 5/2005 | Joe ..................................... 477/5 |
| 2005/0211479 | A1 | * | 9/2005 | Tamor ......................... 180/65.2 |
| 2007/0056783 | A1 | * | 3/2007 | Joe et al. ..................... 180/65.2 |
| 2007/0056784 | A1 | * | 3/2007 | Joe et al. ..................... 180/65.2 |
| 2007/0080005 | A1 | * | 4/2007 | Joe ............................... 180/65.2 |
| 2007/0173374 | A1 | * | 7/2007 | Hayashi .......................... 477/78 |
| 2007/0227791 | A1 | * | 10/2007 | Ueno ........................... 180/65.2 |
| 2008/0210497 | A1 | * | 9/2008 | Jeon ............................. 188/72.1 |
| 2008/0224478 | A1 | * | 9/2008 | Tamor ........................ 290/40 C |
| 2009/0118930 | A1 | * | 5/2009 | Heap et al. ...................... 701/54 |
| 2009/0118936 | A1 | * | 5/2009 | Heap et al. ...................... 701/54 |
| 2010/0305797 | A1 | * | 12/2010 | Jiang ............................... 701/22 |
| 2010/0312422 | A1 | * | 12/2010 | Imaseki .......................... 701/22 |
| 2010/0324762 | A1 | * | 12/2010 | Imaseki et al. ................. 701/22 |
| 2011/0213523 | A1 | * | 9/2011 | Bichler et al. .................. 701/22 |
| 2012/0143415 | A1 | * | 6/2012 | Park ................................ 701/22 |
| 2012/0191281 | A1 | * | 7/2012 | Saito ............................... 701/22 |
| 2012/0244403 | A1 | * | 9/2012 | Maskew et al. ................ 429/99 |

FOREIGN PATENT DOCUMENTS

| | | | | |
|---|---|---|---|---|
| JP | 2004116363 | | 4/2004 | |
| JP | 2004116363 A | * | 4/2004 | ............. F02D 29/02 |
| JP | 2005102492 A | | 4/2005 | |
| JP | 2005138743 A | | 6/2005 | |
| JP | 2006160104 A | | 6/2006 | |
| JP | 2006298079 | | 11/2006 | |
| JP | 2006298079 A | * | 11/2006 | |
| JP | 2006347311 | | 12/2006 | |

OTHER PUBLICATIONS

STIC EIC Fast and Focused Search, Caryn Wesner-Early, Oct. 24, 2013.*

* cited by examiner

TORQUE CONTROL MAP TO INITIATE ENGINE STARTUP PROCESSING IN A HYBRID VEHICLE

TECHNICAL FIELD

The present invention pertains to a hybrid system control method applied to a hybrid vehicle and particularly relates to an axle-split hybrid system control method.

BACKGROUND ART

In JP-A-2006-160104, there is disclosed a hybrid vehicle having a configuration where a transmission and a motor are always coupled to a front wheel axle, an engine is coupled via a clutch to the front wheel axle, and another electric motor is always coupled to a rear wheel axle. According to this hybrid vehicle, when the vehicle is stopped, the hybrid vehicle normally performs idling stop and then starts moving when accelerator pedal operation is performed by the driver, but because engine running efficiency when the hybrid vehicle starts moving is low, the hybrid vehicle starts moving by drive force supplied from the motor as long as it is not suddenly accelerated and continues traveling by the motor until a predetermined velocity or a predetermined required drive force is reached. At this time, friction loss occurs when the stopped engine ends up being rotated by the motor, so the hybrid vehicle performs control that disengages the clutch, thereafter initiates startup of the engine when a predetermined velocity or a predetermined required drive force is reached, engages the clutch, and switches to travel resulting from drive force supplied from the engine.

Moreover, this hybrid vehicle is characterized by the following control. First, the hybrid vehicle calculates from road surface conditions a maximum torque amount that the rear wheels directly coupled to the motor are capable of transmitting, and, when an acceleration required value of the driver is larger than this transmittable maximum torque amount, calculates a torque amount that should be generated by the front wheels, and, when this maximum torque amount is equal to or less than the maximum torque amount of the motor directly coupled to the front wheels, does not start up the engine, leaves the clutch disengaged, and generates torque from the motor of the front wheels. In contrast, when the calculated value of the torque amount that should be generated by the front wheels is equal to or greater than the maximum torque amount of the motor directly coupled to the front wheels, the hybrid vehicle generates a command to start up the engine and engage the clutch. The hybrid vehicle performs clutch engagement/disengagement judgment in this manner depending by predictive control from an anticipated road surface coefficient of friction predicted from the road surface on which the hybrid vehicle travels, so the hybrid vehicle can implement actual clutch engagement with enough time and, as a result, the hybrid vehicle can quickly supply drive force from the engine to the front wheels. That is, the principle that this publicly-known example disclosed has been one that aims to avoid a delay in clutch engagement by predicting and judging whether or not the condition is a condition where engine torque is needed from the acceleration required value of the driver and the road surface conditions.

However, the control principle described above that predicts the transmittable maximum torque determined by the road surface coefficient of friction and calculates the rear wheel motor torque, the front wheel motor torque and the front wheel engine torque cannot avoid a delay in clutch engagement when one wants to quickly transition to engine travel from motor travel using battery power because of the requirement of the battery state-of-charge (SOC), for example. Further, there is absolutely no consideration of the variable speed gear ratio of the transmission coupled between the engine and the axle of the front wheels, so there have been problems such as being unable to reduce shock at the time of clutch engagement.

Patent Document 1: JP-A-2006-160104

DISCLOSURE OF THE INVENTION

Problems that the Invention is to Solve

The present invention has been made in view of the above-described circumstances, and it is an object thereof to provide a hybrid system control method that enables a smooth transition from motor travel to hybrid travel resulting from a motor and an engine from information of driver request drive force and information of vehicle velocity despite the situation-of-charge of a battery and can reduce shock at the time of clutch element engagement by controlling a change gear.

Means for Solving the Problems

In order to solve the above-described problem, according to a hybrid system control method pertaining to the present invention, the hybrid system comprises an internal combustion engine, variable speed means for varying and outputting a rotational velocity of the internal combustion engine, electric means for electrically driving drive wheels, a battery for the electric means, and control means that has a map for deciding target torques of the internal combustion engine and the electric means and is for command-controlling the internal combustion engine and the electric means on the basis of the map, and in the map, there are defined a maximum torque line that demarcates an upper limit torque that the electric means is capable of supplying as a function of at least a vehicle velocity and a battery state-of-charge and a margin torque line that is a predetermined margin lower than the maximum torque line, and the control method comprises the steps of: detecting an accelerator stroke position, the vehicle velocity and the battery state-of-charge; performing electric travel by the electric means when the position on the map determined by the detected accelerator stroke position, vehicle velocity and battery state-of-charge is in a torque position below the margin torque line; initiating startup processing of the engine in order to transition to hybrid travel when the position on the map becomes a torque position on or above the margin torque line; and setting the target torque of the engine and the target torque of the electric means and command-controlling the engine and the electric means in order to achieve a torque corresponding to the detected accelerator stroke position when the position on the map becomes a torque position exceeding the maximum torque line.

According to the present invention, in the map based on the battery state-of-charge (SOC) and the vehicle velocity for deciding the target torques of the internal combustion engine and the electric means, there are defined the maximum torque line that demarcates the upper limit torque that the electric means is capable of supplying and the margin torque line that is a predetermined margin lower than the maximum torque line. When the position on the map determined by the detected accelerator stroke position, vehicle velocity and battery state-of-charge is in a torque position below the margin torque line, the required torque is capable of being supplied by the electric means, so the hybrid system control method performs electric travel by the electric means. When the position on the map becomes a torque position on or above the margin torque line, the hybrid system control method initiates beforehand startup processing of the engine in order to transition to hybrid travel. Additionally, when the position on the map becomes a torque position exceeding the maximum torque line, the hybrid system control method command-controls the engine and the electric means in order to achieve a torque corresponding to the detected accelerator stroke position. In the present invention, the hybrid system control method uses the map based on the battery state-of-charge (SOC) and the vehicle velocity to start up the engine and perform beforehand preparation for hybrid travel when the required torque is on or above the margin torque line, so it can enable a smooth transition from electric travel to hybrid travel by the engine and the electric means from information of the required drive force of the driver and information of the vehicle velocity despite the situation-of-charge of the battery.

The variable speed means is equipped with a clutch element that is connected to an input shaft of the variable speed means, and switching between a forward state and a neutral state of the variable speed means is enabled by engagement and disengagement of the clutch element. In this case, the hybrid system control method causes the clutch element to engage when an idling rotational velocity of the engine and an input shaft velocity of the variable speed means become closer within a predetermined range after startup processing of the engine is initiated.

Further, in the electric travel, the electric means is command-controlled using, as the target torque, a torque corresponding to the detected accelerator stroke position in a state where the engine is stopped and the clutch element is disengaged.

Further, in the step of initiating startup processing of the engine, when the position on the map exceeds the margin torque line, startup processing of the engine is initiated while continuing the electric travel in a state where the clutch element is disengaged. When the position on the map is a torque position between the margin torque line and the maximum torque line, engagement processing of the clutch element is performed after startup processing of the engine ends. Moreover, after engagement of the clutch element, the target torque of the engine is set to 0. When the position on the map is a torque position between the margin torque line and the maximum torque line, the target torque of the engine is set to 0 also after engagement processing of the clutch element ends.

The step of command-controlling the engine and the electric means, which is executed when the position on the map exceeds the maximum torque line, sets the target torque of the electric means to a maximum value coinciding with the maximum torque line and, in order to achieve a vehicle drive required torque corresponding to the detected accelerator stroke position, sets the target torque of the engine to a value obtained by subtracting the maximum torque of the electric means from the vehicle drive required torque. Thus, the hybrid system can smoothly switch from the electric travel resulting from driving only the electric means to hybrid travel resulting from the combined drive force of the electric means and the engine.

In a preferred aspect of the present invention, the hybrid system further comprises variable speed ratio control means for controlling the variable speed means at a variable speed ratio decided using a second map based on the accelerator stroke position and the vehicle velocity, and the control method further comprises the step of using the second map as a variable speed map obtained by pseudo-inputting accelerator stroke position 0 or a value close to 0 when the engine is stopped and the electric means is generating torque. Moreover, the control method further comprises the step of using the second map as a variable speed map obtained by pseudo-inputting a torque command value to the engine instead of the value of the accelerator stroke position when the position on the map becomes a torque position exceeding the maximum torque line.

Thus, before the clutch element is engaged, a pseudo accelerator stroke position signal that is smaller than the actual accelerator stroke position is inputted to the variable speed ratio control means, so the variable speed ratio control means sets the variable speed means to a higher gear side before engagement of the clutch element. In this manner, the rotational velocity of the input shaft of the variable speed means moves to a lower speed side and its difference with the rotational velocity of the engine decreases. Consequently, shock when engaging the clutch element and changing the clutch element to the forward state can be reduced.

In another preferred aspect of the present invention, the control means predicts the rotational velocity of the input shaft of the variable speed means on the basis of gear ratio information of the variable speed means and the vehicle velocity before the clutch element is engaged and executes control to move the idling rotational velocity of the engine closer to the predicted rotational velocity. Thus, shock when changing the clutch element to the forward state can be reduced.

DESCRIPTION OF THE REFERENCE NUMERALS AND SIGNS

10 Hybrid Vehicle
12 Internal Combustion Engine
14 Starter Motor
16 Neutral/Forward Clutch Element
17 First Drive System
18 Automatic Variable Speed Transmission (AT)
20L, 20R Front Wheels
22L, 22R Rear Wheels
24 Battery
26 Main Motor 27 Second Drive System
28 Differential Gear
30 Torque Converter
31 AT Input Shaft
38 Engine Controller
44 AT Controller
46 Inverter
48 Battery Controller
50 Hybrid Controller
52 Drive Torque and Output Required Value Calculating Means
54 Battery SOC Judging Means
56 Electric Travel (E-Drive) Mode Control Command Generating Means
58 Hybrid Travel (HEV-drive) Mode Control Command Generating Means
60 Engine Start Stop Mode Control Command Generating Means
62 Clutch Engagement Mode and AT Variable Speed Mode Control Command Generating Means
64 Accelerator Stroke Position Sensor
66 Vehicle Velocity Sensor
67 AT Input Velocity Sensor
68 Engine Rotational Velocity Sensor
70 State Map
80, 82, 84 Variable Speed Lines
86 Pseudo Accelerator Stroke Position Signal Line
88 Pseudo Accelerator Stroke Position Signal Curve Corresponding to Engine Torque Command

EMBODIMENTS

Embodiment of the present invention will be described below with reference to the drawings.

Figure 1:
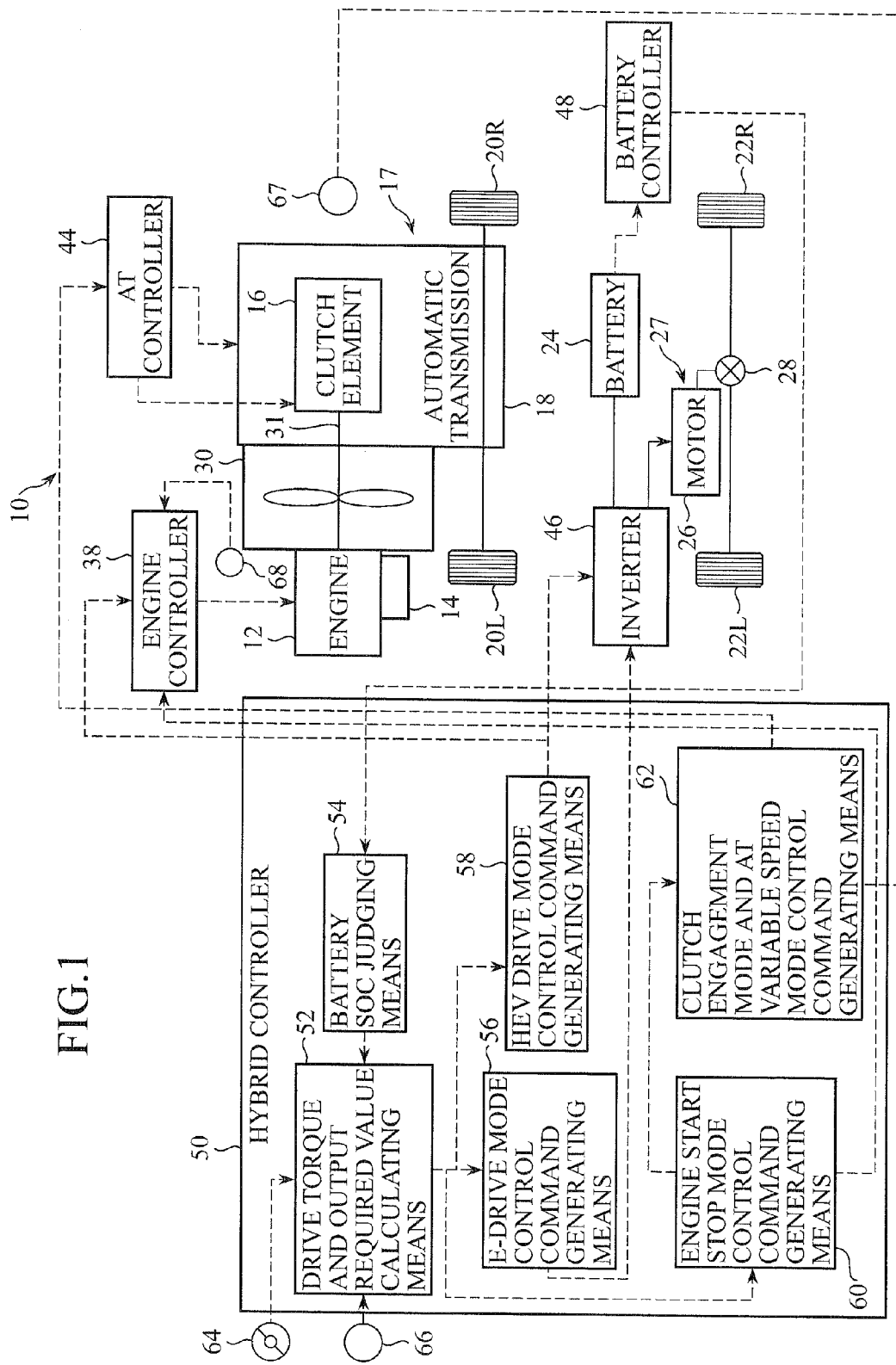
FIG. 1 is a block diagram showing a hybrid system control method pertaining to an embodiment of the present invention and a general diagram of a vehicle to which the hybrid system control method is applied.

In FIG. 1, there are shown a vehicle 10 to which a hybrid system control method pertaining to a first embodiment of the present invention is applied and a control system of the vehicle 10 that enables control of the hybrid system. The vehicle 10 is a four-wheel drive hybrid vehicle where an electric axle unit is placed on a driven wheel axle of an existing two-wheel drive vehicle and which is configured by minimum vehicle alteration, and the vehicle 10 is equipped with an internal combustion engine 12, a starter motor 14 for starting up the engine 12, a first drive system 17 for transmitting drive force of the internal combustion engine to an axle of front wheels 20L and 20R, a battery 24, and a second drive system 27 for supplying electric power to an axle of rear wheels 22L and 22R.

The first drive system 17 is equipped with a torque converter 30 and an automatic variable speed transmission 18. The transmission 18 is equipped with a neutral/forward clutch element 16 for switching between a neutral state and a forward state; an output shaft of the engine 12 is connected to an input shaft 31 of the transmission 18 via the torque converter 30, and the input shaft 31 is connected to an input side of the clutch element 16. When the clutch element 16 is disengaged, the clutch element 16 enters the neutral state such that the output of the engine 12 is not transmitted to the axle of the front wheels, and when the clutch element 16 is engaged, the output of the engine 12 is transmitted to the axle of the front wheels 20L and 20R via the transmission 18.

The second drive system 27 is equipped with a main motor 26 to which electric power is supplied by the battery 24 and a differential gear 28 that is disposed on the axle of the rear wheels. The electric power from the main motor 26 is transmitted onto the rear wheel axle via the differential gear 28.

The main motor 26 can generate electric power at the time of a regeneration sequence and can charge the battery 24.

As shown in FIG. 1, the control system of the vehicle 10 is equipped with an engine controller 38 that executes necessary control in order to control the engine, an AT controller 44 that controls the transmission 18 beginning with engagement and disengagement of the clutch element 16, a battery controller 48 for controlling charge and discharge of the battery 24, an inverter 46 that controls the torque and speed of the main motor 26, and a hybrid controller 50 that executes a hybrid control method pertaining to a first embodiment of the present invention by managing and command-controlling the aforementioned controllers and inverter. Moreover, the control system of the vehicle 10 is equipped with an accelerator stroke position sensor 64 that detects an accelerator stroke position, a vehicle velocity sensor 66 that detects a vehicle velocity, an AT input velocity sensor 67 that detects a rotational velocity Ni of the input shaft 31 of the transmission, and an engine rotational velocity sensor 68 that detects a rotational velocity Id of the engine 12.

Moreover, in FIG. 1, there is shown a functional block diagram of the hybrid controller 50. According to this functional block diagram, the hybrid controller 50 is equipped with drive torque and output required value calculating means 52 that calculates a drive torque required value and an output required value that the driver requires on the basis of an accelerator stroke position signal from the accelerator stroke position sensor 64 and a vehicle velocity signal from the vehicle velocity sensor 66, battery SOC judging means 54 that judges a state-of-charge (SOC) of the battery 24 on the basis of a signal from the battery controller 48, electric travel (E-drive) mode control command generating means 56 that command-controls the inverter 46 to control the main motor 26 on the basis of output values from the drive torque and output required value calculating means 52, hybrid travel (HEV-drive) mode control command generating means 58 that command-controls the engine controller 38 and the inverter 46 to control the engine 12 and the main motor 26 on the basis of the output values from the drive torque and output required value calculating means 52, engine start stop mode control command generating means 60 that command-controls the engine controller 38 to command the engine to start and stop on the basis of the output values of the drive torque and output required value calculating means 52, and clutch engagement mode and AT variable speed mode control command generating means 62 that command-controls the AT controller 44 to control engagement and disengagement of the clutch element 16 and a variable speed mode of the transmission 18 on the basis of the output values from the drive torque and output required value calculating means 52 and information from the engine start stop mode control command generating means 60.

Figure 4:
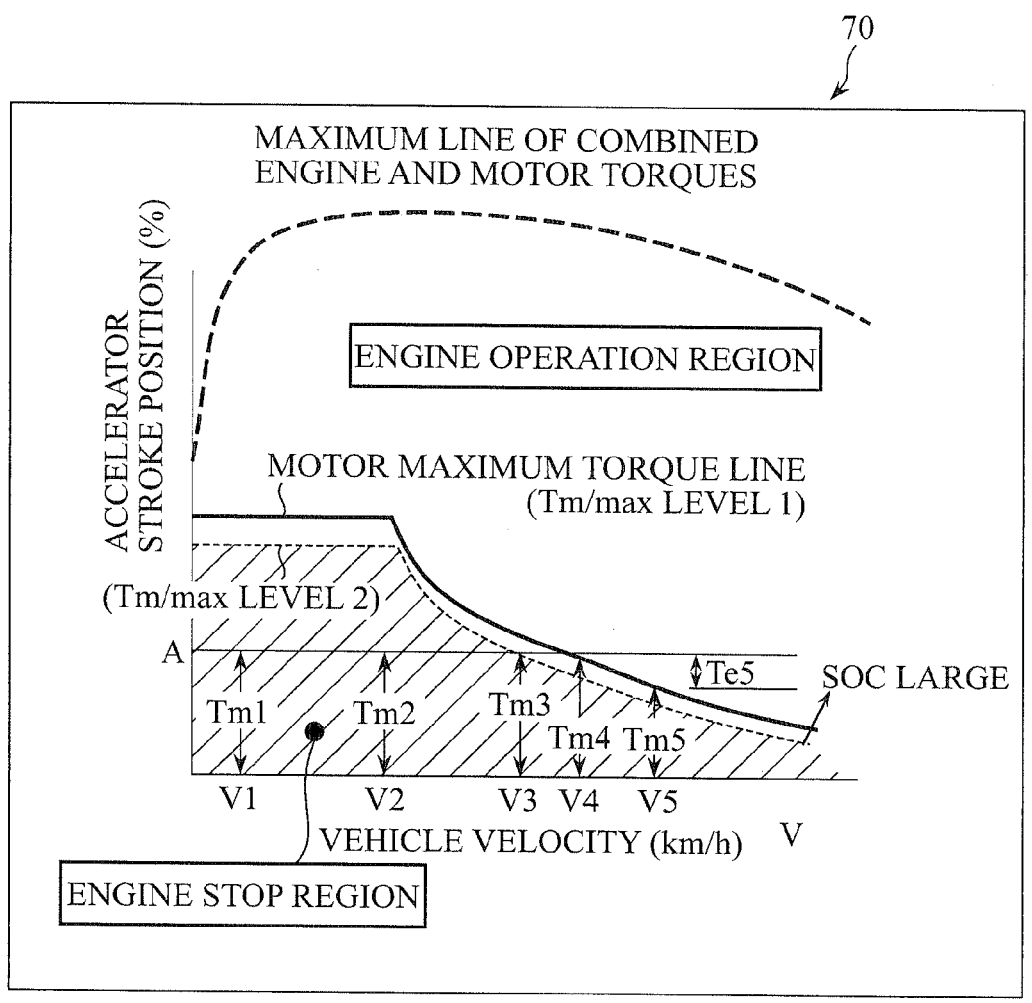
FIG. 4 is a general diagram of a state map for deciding a torque required amount based on an accelerator stroke position A, a vehicle velocity V and a battery state-of-charge SOC.

As shown in FIG. 4, the drive torque and output required value calculating means 52 stores, in a memory, a state map 70 for deciding torque required amounts with respect to the engine 12 and/or the main motor 26 on the basis of the accelerator stroke position A, the vehicle velocity V and the battery state-of-charge SOC. In this map 70, as a function of the vehicle velocity V and the battery state-of-charge SOC, there is defined a motor maximum torque line (Tm/max level 1) that demarcates an upper limit torque that the main motor 26 can supply. That is, in the map 70, the torque region that exceeds Tm/max level 1 becomes a region where the torque of the engine is added in addition to the torque of the main motor 26 in order to satisfy the required torque from the operator corresponding to the accelerator stroke position—that is, an engine operation region. On the other hand, the torque region in the range that does not exceed Tm/max level becomes a region where the required torque from the operator corresponding to the accelerator stroke position can be satisfied by just the torque of the main motor 26 without having to operate the engine—that is, an engine stop region (diagonal line portion). Further, in the map 70, there is also defined a motor margin torque line (Tm/max level 2, dotted line) that is set low in consideration of a predetermined margin from the motor maximum torque Tm/max level 1. Moreover, a maximum line of combined engine and motor torques is also indicated by a dotted line.

Figure 5:
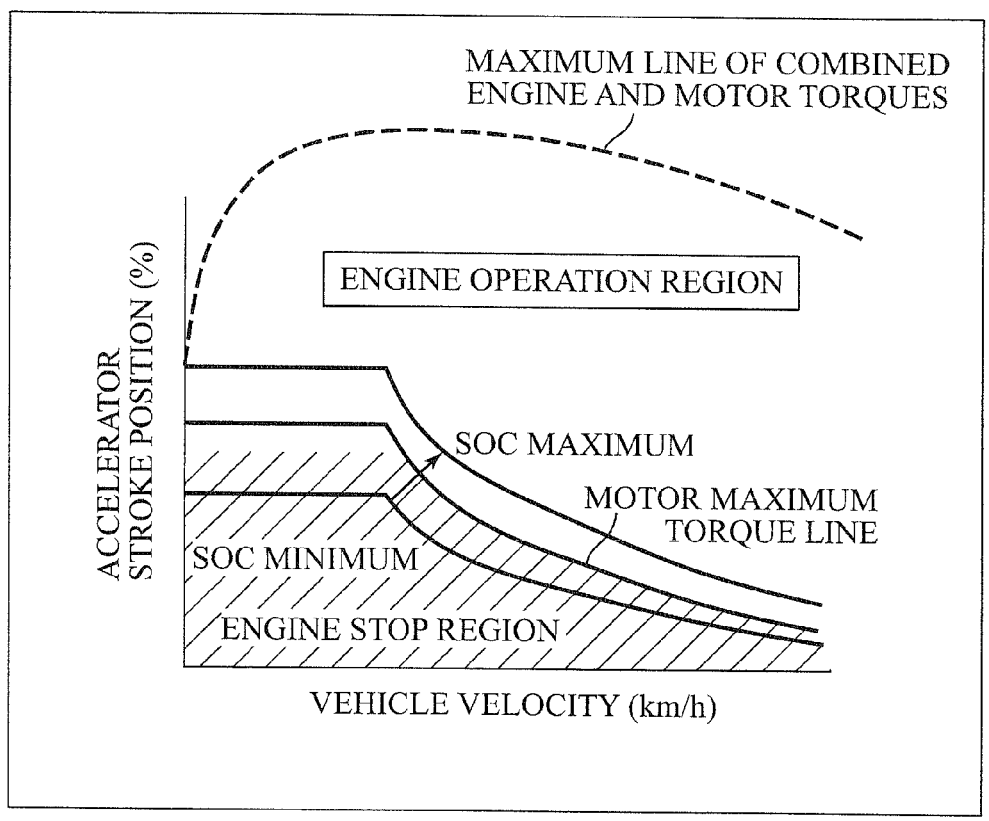
FIG. 5 is a diagram showing how the state map of FIG. 4 changes depending on the battery state-of-charge SOC.

The motor maximum torque line (Tm/max level 1) and the motor margin torque line (Tm/max level 2) change depending on the SOC as shown in FIG. 5. That is, when the SOC becomes larger, the motor maximum torque line (and the motor margin torque line in correspondence to this) shifts upward, that is, in the direction in which it increases the supply upper limit torque of the main motor 26, and when the SOC becomes smaller, the motor maximum torque line (and the motor torque line in correspondence to this) shifts downward, that is, in the direction in which it decreases the supply upper limit torque of the main motor 26.

A procedure of deciding the torque amount that the engine 12 and/or the main motor 26 should output will be briefly described on the basis of the map 70 of FIG. 4. For example, when the accelerator stroke position (%) of the operator is A, this state exists in the engine stop region in vehicle velocity V1. Consequently, torque Tm1, which satisfies the torque required amount from the operator corresponding to the accelerator stroke position A, is required of only the main motor 26 and is not required of the engine 12. When the vehicle velocity rises and becomes V2, this state exists in the engine stop region, so torque Tm2 (which is equal to Tm1 if there is no change in the accelerator stroke position A) corresponding to the accelerator stroke position A is required of only the main motor 26. When the accelerator stroke position is A and the vehicle velocity further rises and becomes V3, this state point is on the motor margin torque line, and even at this stage, torque Tm3 (which is equal to Tm1 and Tm2 if there is no change in the accelerator stroke position A) is required of only the main motor 26. When the accelerator stroke position is A and the vehicle velocity becomes V4, this state point is on the motor maximum torque line, and torque Tm4 (which is equal to Tm1, Tm2 and Tm3 if there is no change in the accelerator stroke position A) of the upper limit that the motor 26 is capable of supplying at this accelerator stroke position is required of only the main motor 26. When the vehicle velocity reaches V5, the state point enters the engine operation region and the torque required amount of the operator corresponding to the accelerator stroke position A exceeds the torque upper limit that the motor 26 is capable of providing, so torque Tm5 on the motor maximum torque line corresponding to the vehicle velocity V5 is required of the motor 26 and torque Te5 that is the difference between this Tm5 and the torque required amount A of the operator is required of the engine. That is, hybrid travel of the motor and the engine starts.

Next, a flow of processing based on the hybrid control method pertaining to the first embodiment will be described using the flowcharts of FIG. 2 and FIG. 3.

Figure 2:
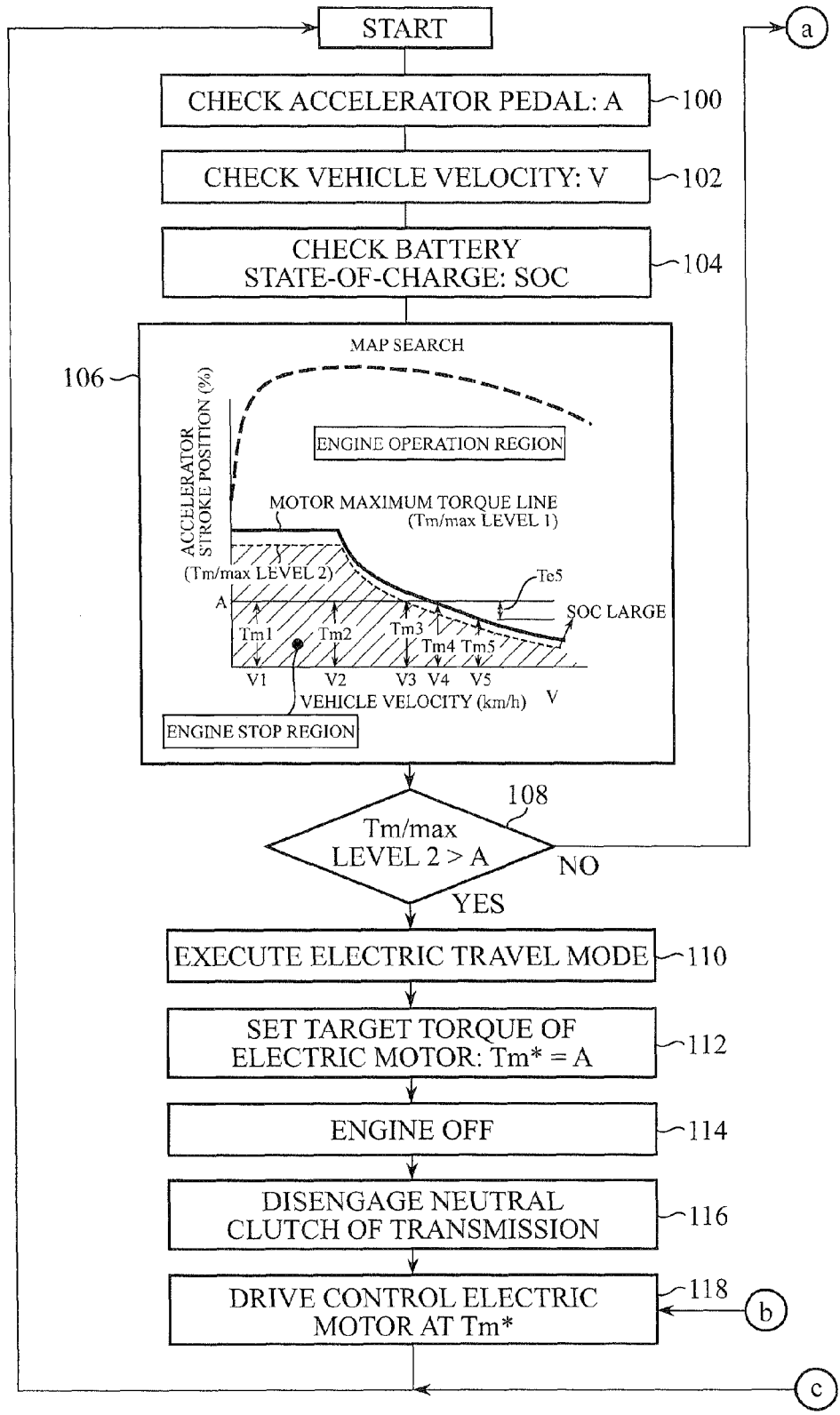
FIG. 2 is a main flowchart showing the flow of the hybrid system control method pertaining to the embodiment of the present invention.

The processing of FIG. 2 is first started when the vehicle 10 starts moving as a result of the main motor 26 being driven in a state where the engine 12 and the starter motor 14 are stopped and the clutch element 16 is disengaged.

As shown in FIG. 2, the drive torque and output required value calculating means 52 checks the signal from the accelerator stroke position sensor 64 to determine the accelerator stroke position A (step 100) and checks the vehicle velocity signal from the vehicle velocity sensor 66 to determine the vehicle velocity V (step 102). The battery SOC judging means 54 checks the battery 24 to determine the battery state-of-charge (SOC) that is the ratio of the charge amount with respect to the maximum charge amount of the battery 24 (step 104).

Next, in which position of the map 70 of FIG. 4 is the state point decided by the accelerator stroke position A, the vehicle velocity V and SOC determined in steps 100 to 104 is searched (step 106). As a result of the search, it is judged whether or not the motor margin torque line (Tm/max level 2) of the map 70 exceeds the accelerator stroke position A (step 108). When Tm/max level 2 exceeds the accelerator stroke position A (YES determination in step 108), it is in the engine stop region in the map 70 of FIG. 4, so the processing executes an electric travel mode (step 110). That is, the processing sets a target torque Tm* of the main motor to a torque corresponding to the accelerator stroke position A (step 112), switches OFF the engine 12 (step 114), disengages the clutch element 16 of the transmission 18 (step 116), and controls the main motor 26 to output the target torque Tm* (step 118). From then on, the processing returns to step 100 and again executes the same procedure. Processing from steps 110 to 118 corresponds to processing by which the motor is controlled to output torque Tm1, Tm2 or Tm3 in the example of FIG. 4.

Processing when the motor margin torque line (Tm/max level 2) of the map 70 does not exceed the accelerator stroke position A in step 108 will be described with reference to the flowchart of FIG. 3.

Figure 3:
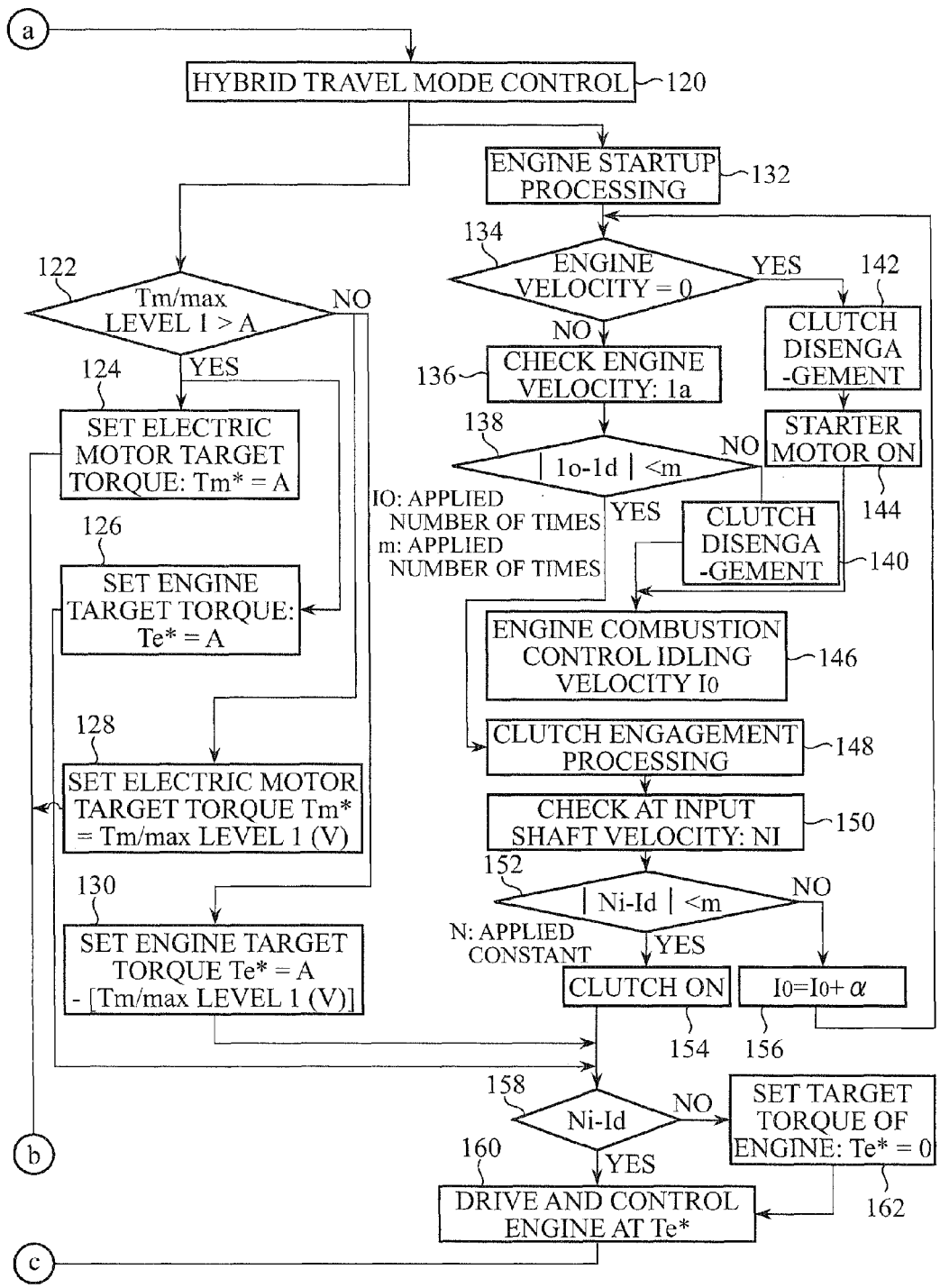
FIG. 3 is a flowchart showing the flow of a hybrid running mode of the hybrid system control method pertaining to the embodiment of the present invention.

As shown in FIG. 3, when the motor margin torque line (Tm/max level 2) of the map 70 does not exceed the accelerator stroke position A, the processing transitions to a hybrid travel mode (step 120). In the hybrid travel mode, target torque setting processing from steps 122 to 130 below and engine startup processing from steps 132 to 156 are executed in parallel.

In the target torque setting processing, it is judged whether or not the motor maximum torque line (Tm/max level 1) of the map 70 exceeds the torque corresponding to the accelerator stroke position A (step 122).

When Tm/max level 1 exceeds the accelerator stroke position A (YES determination in step 122), it is in the engine stop region in the map 70 of FIG. 4, so the processing executes the electric travel mode (step 110). That is, the processing sets the target torque Tm* of the main motor to the torque corresponding to the accelerator stroke position A (step 124), returns to step 118 of FIG. 2, and controls the main motor 26 to output the target torque Tm*. In parallel with this, the processing sets the target torque Te* of the engine to 0 (step 126) and moves to later-described step 158 in order to perform engine drive control.

That is, when the accelerator stroke position A is equal to or greater than Tm/max level 2 but is smaller than Tm/max level 1, in contrast to the normal electric travel mode of accelerator pedal FIG. 3, the processing immediately moves to step 118 and performs electric travel without executing step 114 (engine OFF) and step 116 (disengagement of the clutch element 16 of the transmission)—that is, without executing an engine stop measure—and performs a step of preparing for engine startup. The processing of steps 124 and 126 corresponds to processing by which the motor is controlled to output torque Tm3 or Tm4 in the example of FIG. 4.

In contrast, when Tm/max level 1 does not exceed the accelerator stroke position A (NO determination in step 122), it is in the engine operation region in the map 70 of FIG. 4, so the processing sets the target torque Tm* of the main motor 26 to Tm/max level 1 (step 128), returns to step 118 of FIG. 2, and controls the main motor 26 to output the maximum torque that becomes possible at the vehicle velocity and SOC at that point in time. Further, in parallel with this, the processing sets the target torque Te* of the engine to (A−Tm/max level 1) (step 130) and moves to later-described step 158 in order to perform engine drive control.

The engine startup processing in the hybrid travel mode starts from step 132, and it is judged whether or not the engine velocity is 0 (step 134). When the engine velocity is 0 (YES determination in step 134), the processing disengages the clutch 16 (step 142), switches ON the starter motor 14 (step 144), starts engine combustion, controls the engine 12 to rotate at an engine target idling velocity $I_0$ (step 146), returns to step 134, and executes the same processing.

When the engine velocity is not 0 (NO determination in step 134), the processing checks the engine velocity $I_d$ (step 136). Next, the processing determines whether or not the following expression is true using $I_0$ as the above-described engine target idling velocity and m as a given constant (step 138).

$$|I_0-I_d|<m \qquad (1)$$

When expression (1) is not true, that is, when there is a significant difference between the engine velocity Id and the engine target idling velocity $I_0$ (NO determination in step 138), the processing continues executing tracking control of the engine target idling velocity $I_0$ of the engine 12 (step 146) in a state where it has disengaged the clutch element 16 (step 140), returns to step 134, and again executes the same processing.

When $|I_0-I_d|<m$ is true, that is, when the engine velocity Id can be regarded as having substantially reached the engine target idling velocity $I_0$ (YES determination in step 138), the processing starts clutch engagement processing (step 148). When the clutch engagement procedure is executed, the output signal from the AT input velocity sensor 67 is again checked and the rotational velocity $N_i$ of the input shaft 31 is determined (step 150). Next, it is determined whether or not the difference between the engine idling velocity $I_d$ and the input shaft velocity $N_i$ determined in step 150 falls within a constant range (step 152). Specifically, it is determined whether or not the following inequality expression (2) is true.

$$|N_i-I_d|<n \qquad (2)$$

Here, n is an applied constant.

When inequality expression (2) is true (YES determination in step 152), the processing switches ON the clutch element 16 (step 154) and causes the clutch to engage. After clutch engagement, the engine velocity $I_d$ and the AT input shaft velocity $N_i$ become equal (YES determination in step 158), so the processing controls the engine 12 to achieve the engine target torque Te* set in step 126 or step 130 (step 160), returns to step 100 of FIG. 2, and again executes the same procedure. When the engine target torque has been determined in step 130, the main motor 126 is controlled by target torque Tm*=A, the engine 12 is controlled by target torque Te*=(A−Tm/max level 1), and the vehicle 10 travels in the hybrid mode. This corresponds to processing by which the motor 26 is controlled to output torque Tm5 and the engine 12 is controlled to output torque Te5 in the example of FIG. 4. On the other hand, when the engine target torque has been determined in step 126 (when the engine target torque Te*=0), the clutch element 16 is left engaged in the forward state and the engine is controlled such that the engine output torque becomes 0 until the next command comes.

When the processing moves from step 126 and step 130 to step 158, there may also be a situation where clutch engagement operation has not yet been executed. In this case, the engine velocity $I_d$ and the AT input shaft velocity $N_i$ are not equal (NO determination in step 158), so the processing clears the engine target torque Te* to 0 (step 162) and moves to step 160.

When inequality expression (2) is not true in step 156 (NO determination in step 156), the processing adds a to the target idling velocity $I_0$ (step 156), changes the target idling velocity to ($I_0+\alpha$), returns to step 134, again executes the above-described procedure, and executes operation to move the engine idling velocity closer to the AT input shaft velocity $N_i$.

In the processing described above, the clutch element 16 is caused to engage in the forward state in a state where the difference in the rotational velocities of the engine 12 and the AT input shaft 31 is small, so slipping of the clutch can be alleviated and shock based on clutch engagement can also be reduced.

The embodiment of the present invention is characterized in that it uses the following characteristics in order to more effectively alleviate shock of engagement of the clutch element 16.

Figure 6:
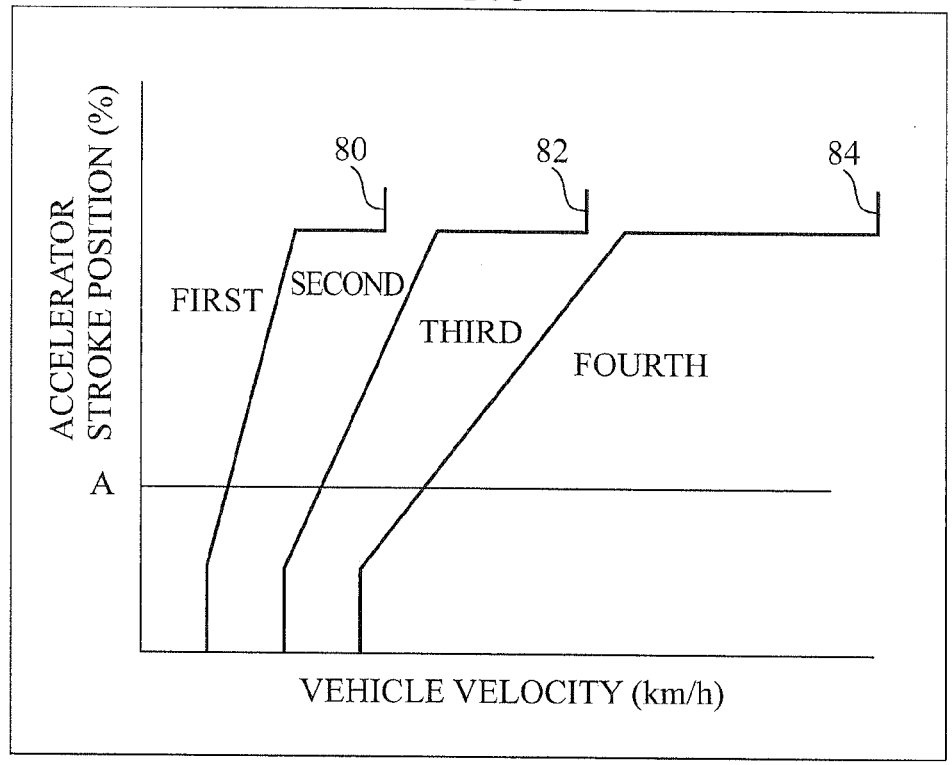
FIG. 6 is a map diagram of a conventional variable speed pattern based on vehicle velocity and accelerator stroke position.

(1) The AT controller 44 normally decides, on the basis of the variable speed ratio map shown in FIG. 6, a variable speed ratio from the accelerator stroke position and the vehicle velocity that are sent to the AT controller 44. According to the variable speed ratio map of FIG. 6, the transmission is controlled to switch to first if the vehicle velocity V is a lower velocity than line 80, switch to second between line 80 and 82, switch to third between line 82 and 84, and switch to fourth at line 84 and beyond. The lines 80, 82 and 84 have ever-increasing slanting portions, so in the intervals between these lines, the vehicle velocity at the time of variable speed also rises as the accelerator stroke position rises. Stated conversely, when the accelerator stroke position becomes closer to 0, the transmission is switched to a high-speed gear ratio even at a lower vehicle velocity.

Figure 7:
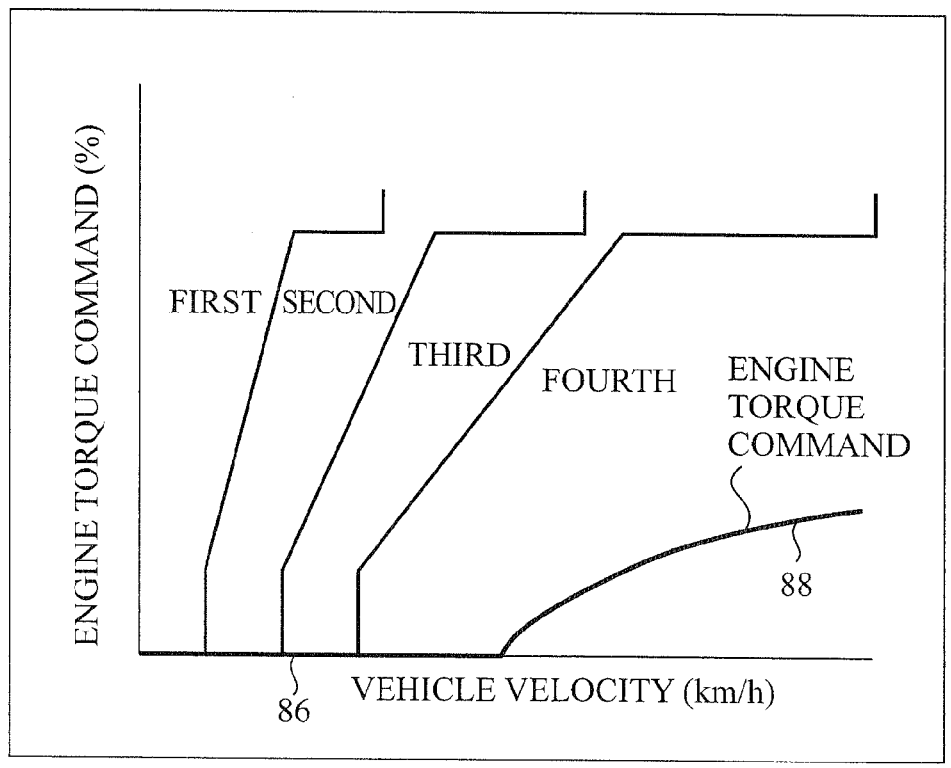
FIG. 7 is a map diagram showing a pseudo accelerator stroke position signal line generated in accordance with the embodiment of the present invention and a pseudo accelerator stroke position signal curve corresponding to an engine torque command in the map diagram of FIG. 6.

Thus, the clutch engagement mode and AT variable speed mode control command generating means 62 sends the detected accelerator stroke position directly to the AT controller 44 during normal operation, but after transition to the hybrid mode (step 120) of FIG. 3 and before the clutch engagement processing (step 148), it converts the accelerator stroke position signal to 0 or a value close to 0 and pseudo-inputs it to the AT controller 44. For example, as shown in FIG. 7, this pseudo accelerator stroke position signal is controlled as indicated by line 86. Consequently, before engagement of the clutch element 16, the transmission 18 is set to a higher gear side, and in this manner the rotational velocity of the input shaft 31 of the transmission 18 moves to a lower velocity side. The rotational velocity of the engine is still low before clutch engagement, so the degree to which both velocities coincide improves, and shock when engaging the clutch element 16 and changing the clutch element 16 to the forward state can be reduced.

(2) After transitioning to the hybrid travel mode, in step 122 of FIG. 3, when the torque corresponding to the accelerator stroke position A exceeds Tm/max level 1 (NO determination in step 122), the engine target torque Te* is set to (A−Tm/max level 1) (step 130). At this time, the clutch engagement mode and AT variable speed mode control command generating means 62 inputs the value corresponding to this target torque Te* to the AT controller 44 as a pseudo accelerator stroke position signal. For example, as shown in FIG. 7, this pseudo accelerator stroke position signal is controlled as indicated by curve 88. The point in time of the switch from the line 86 to the curve 88 corresponds to the point in time when step 130 is executed. Thus, the processing realizes a variable speed state commensurate with the actual engine output and can smoothly transition to hybrid travel.

(3) In item (1) described above, when the processing engages the clutch element 16 and changes the clutch element 16 to the forward state, the processing predicts beforehand, in the engine whose startup has ended, the rotational velocity of the transmission input shaft 31 on the basis of gear ratio information of the transmission 18 at that time and vehicle velocity information and performs control to move the engine idling rotational velocity closer to this predicted value. Thereafter, the processing changes the clutch element 16 to the forward state, whereby shock can be reduced. For example, the processing can move the engine idling rotational velocity closer to the predicted value by adding a to the target value $I_0$ of the engine idling rotational velocity.

Embodiments of the present invention have been described above, but the present invention is not limited only to the above-described examples and is arbitrarily suitably alterable in the scope of the present invention defined by the claims. For example, in the configuration of FIG. 1, the first drive system 17 driven by the engine is disposed on the front wheel side and the second drive system 27 having the main motor 26 is disposed on the rear wheel side, but the second drive system 27 having the main motor 26 may also be disposed on the front wheel side and the first drive system 17 driven by the engine may also be disposed on the rear wheel side. Further, the present invention can also be applied to a two-wheel drive hybrid vehicle where output shafts of both the main motor and the engine are coupled to either of the axles on the front wheel side and the rear wheel side.

The invention claimed is:

1. A hybrid system control method,
the hybrid system comprising
an internal combustion engine,
variable speed means for varying and outputting a rotational velocity of the internal combustion engine,
electric means for electrically driving drive wheels,
a battery for the electric means, and
control means that has a map for deciding target torques of the internal combustion engine and the electric means and is for command-controlling the internal combustion engine and the electric means on the basis of the map,
and in the map, there are defined a maximum torque line that demarcates an upper limit torque that the electric means is capable of supplying as a function of at least a vehicle velocity and a battery state-of-charge and a margin torque line that is a predetermined margin lower than the maximum torque line,
the control method comprising the steps of:
detecting an accelerator stroke position, the vehicle velocity and the battery state-of-charge;
performing electric travel by the electric means when the position on the map determined by the detected accelerator stroke position, vehicle velocity and battery state-of-charge is in a torque position below the margin torque line;
initiating startup processing of the engine in order to transition to hybrid travel when the position on the map becomes a torque position on or above the margin torque line; and
setting the target torque of the engine and the target torque of the electric means and command-controlling the engine and the electric means in order to achieve a torque corresponding to the detected accelerator stroke position when the position on the map becomes a torque position exceeding the maximum torque line.

2. The hybrid system control method according to claim 1, wherein the variable speed means is equipped with a clutch element that is connected to an input shaft of the variable speed means, and switching between a forward state and a neutral state of the variable speed means is enabled by engagement and disengagement of the clutch element.

3. The hybrid system control method according to claim 2, wherein in the step of initiating startup processing of the engine, startup processing of the engine is executed in a state where the clutch element is disengaged.

4. The hybrid system control method according to claim 3, further comprising the step of causing the clutch element to engage when an idling rotational velocity of the engine and an input shaft velocity of the variable speed means become closer within a predetermined range after startup processing of the engine is initiated.

5. The hybrid system control method according to claim 2, wherein in the electric travel, the electric means is command-controlled using, as the target torque, a torque corresponding to the detected accelerator stroke position in a state where the engine is stopped and the clutch element is disengaged.

6. The hybrid system control method according to claim 3, further comprising the step of setting the target torque of the engine to 0 after startup processing of the engine ends when the position on the map is a torque position between the margin torque line and the maximum torque line.

7. The hybrid system control method according to claim 2, further comprising the step of setting the target torque of the engine to 0 also after engagement of the clutch element ends when the position on the map is a torque position between the margin torque line and the maximum torque line.

8. The hybrid system control method according to claim 1, wherein the step of command-controlling the engine and the electric means sets the target torque of the electric means to a maximum value coinciding with the maximum torque line and, in order to achieve a vehicle drive required torque corresponding to the detected accelerator stroke position, sets the target torque of the engine to a value obtained by subtracting the maximum torque of the electric means from the vehicle drive required torque.

9. The hybrid system control method according to claim 5, wherein
the hybrid system further comprises variable speed ratio control means for controlling the variable speed means at a variable speed ratio decided using a second map based on the accelerator stroke position and the vehicle velocity, and
the control method further comprises the step of using the second map as a variable speed map obtained by pseudo-inputting accelerator stroke position 0 or a value close to 0 when the engine is stopped and the electric means is generating torque.

10. The hybrid system control method according to claim 1, wherein
the hybrid system further comprises variable speed ratio control means for controlling the variable speed means at a variable speed ratio decided using a second map based on the accelerator stroke position and the vehicle velocity, and
the control method further comprises the step of using the second map as a variable speed map obtained by pseudo-inputting a torque command value to the engine instead of the value of the accelerator stroke position when the position on the map becomes a torque position exceeding the maximum torque line.

11. The hybrid system control method according to claim 4, further comprising the step of predicting the rotational velocity of the input shaft of the variable speed means on the basis of gear ratio information of the variable speed means and the vehicle velocity before the clutch element is engaged and executing control to move the idling rotational velocity of the engine closer to the predicted rotational velocity.

\* \* \* \* \*